US008584452B2

(12) United States Patent
Lloyd

(10) Patent No.: US 8,584,452 B2
(45) Date of Patent: Nov. 19, 2013

(54) INFINITELY-VARIABLE, HYDRO-MECHANICAL TRANSMISSION USING FIXED DISPLACEMENT PUMPS AND MOTORS

(75) Inventor: Robert Hugh Francis Lloyd, Los Altos, CA (US)

(73) Assignee: Lloydco LLC, Los Altos, CA (US)

( * ) Notice: Subject to any disclaimer, the term of this patent is extended or adjusted under 35 U.S.C. 154(b) by 913 days.

(21) Appl. No.: 12/728,268

(22) Filed: Mar. 21, 2010

(65) Prior Publication Data

US 2011/0056195 A1 Mar. 10, 2011

Related U.S. Application Data

(60) Provisional application No. 61/240,088, filed on Sep. 4, 2009.

(51) Int. Cl.
*F16D 31/02* (2006.01)

(52) U.S. Cl.
USPC ............... 60/437; 60/413; 60/493; 60/494

(58) Field of Classification Search
USPC ........... 60/348, 363, 413, 425, 435, 437, 485, 60/493, 494
See application file for complete search history.

(56) References Cited

U.S. PATENT DOCUMENTS 3,690,097 A * 9/1972 Widmaier ................... 60/435
4,037,409 A * 7/1977 Leibach ...................... 60/437

* cited by examiner

*Primary Examiner* — Michael Leslie

(57) ABSTRACT

This invention consists of two or more fixed displacement hydraulic pump/motors mounted on a common input shaft hydraulically connected to two or more fixed hydraulic pump/motors mounted on a common output shaft. The relative displacements of the pump/motors are chosen such that by selectively activating the individual pump/motors, the transmission ratio can be changed in the case when the input devices and acting as pumps driving the output devices as motors (conversely when driving the vehicle in reverse). Further, a hydraulic accumulator and reservoir are attached in a manner that allows the pressurized fluid to augment the flow produce by the input pumps in order to increase the transmission ratio. Similarly, the transmission ratio can also be reduced by causing the input pumps to pump fluid into the accumulator at the same time they are pumping fluid through the output motors. The transmission also contains a single speed all mechanical by-pass for use when cruising and an input reduction gear to increase the torque and power capacity of the transmission.

A further feature of the transmission is a valve arrangement that allows the transmission to generate a continuously variable braking torque when the transmission is used to supply braking force to the vehicle.

In addition, the transmission includes a selectable, one-way clutch that connects the input directly to the output. When engaged, this clutch provides an all mechanical by-pass to the hydraulic transmission for use when cruising in order to improve the efficiency.

18 Claims, 6 Drawing Sheets

| Relative displacement | A | B | C | D | Gear | gr | gr with input gearing* | |
|---|---|---|---|---|---|---|---|---|
| | 5 | 8 | 6 | 13 | | | | |
| | 1 | 0 | 1 | 1 | 1st | 3.800 | 8.223 | |
| | 1 | 0 | 0 | 1 | 2nd | 2.600 | 5.626 | |
| gr = gear ratio | 0 | 1 | 1 | 1 | 3rd | 2.375 | 5.140 | |
| | 0 | 1 | 0 | 1 | 4th | 1.625 | 3.517 | |
| 1 = pump/motor engaged | 1 | 1 | 1 | 1 | 5th | 1.462 | 3.163 | Passing gear |
| | 1 | 0 | 1 | 0 | 6th | 1.200 | 2.597 | |
| 0 = pump/motor disengaged | 1 | 1 | 0 | 1 | 7th | 1.000 | 2.164 | |
| | 0 | 1 | 1 | 0 | 8th | 0.75 | 1.623 | |
| | 1 | 1 | 1 | 0 | 9th | 0.46 | 0.999 | Cruise |

* Resulting transmission ratio with input reduction gear ratio of 2.164

Fig. 2

INFINITELY-VARIABLE, HYDRO-MECHANICAL TRANSMISSION USING FIXED DISPLACEMENT PUMPS AND MOTORS

RELATED APPLICATIONS

This application relates to and claims any and all benefits of U.S. provisional application No. 61/240,088 titled HYDRO-MECHANICAL TRANSMISSION USING FIXED DISPLACEMENT PUMP/MOTORS Inventor ROBERT HUGH FRANCIS LLOYD filed Sep. 4, 2009.

BACKGROUND OF THE INVENTION

1. Field of Art

This invention relates to the improvement of a hydro-mechanical transmission. More specifically, the invention relates to the use of fixed displacement hydraulic pump/motors rather the variable displacement pump/motors.

2. Description of the Prior Art

Most if not all hydrostatic and hydro-mechanical transmissions rely on variable-displacement hydraulic pump/motors as a means of changing the transmission ratio of input rotational speed to output rotational speed. Hydro-mechanical transmissions also contain a parallel variable all-mechanical path. The size, cost, complexity, noise, failure rate, and energy losses (under some conditions) of variable displacement pumps and motors are much greater than fixed displacement devices of the same max. displacement and are to the detriment of the transmission. Many transmissions achieve variability of the transmission ratio by varying the amount of power that is re-circulated within the transmission. These re-circulating schemes result in large power losses due to the inefficiency of the power transfer between the elements of the transmission. Many prior art transmissions contain a variable mechanical path in parallel with a variable hydraulic path. Variability is obtained by varying the amount of power transmitted by both these paths. They result in some power being transmitted by the hydraulic path almost all the time. The low efficiency of the hydraulic path causes large losses and fluid heating when operated at high speeds for extended periods.

A hydro-mechanical transmission that would use only fixed-displacement hydraulic devices, contain a highly efficient means of re-circulating power and have a high efficiency mechanical by-pass of the hydraulic portion of the hydraulic transmission, would be an improvement to the state of the art.

OBJECTS OF THE INVENTION

It is an object of the present invention to provide a hydro-mechanical transmission system suitable for passenger vehicle use.

It is an object of the present invention to provide a hydro-mechanical transmission system that is simple to build and low cost.

It is an object of the present invention to provide a hydro-mechanical transmission system that is small relative to the amount of power it can transmit.

It is an object of the present invention to provide a hydro-mechanical transmission system that has an efficiency comparable to present day automatic transmissions.

It is an object of the present invention to provide a hydro-mechanical transmission system does not use variable displacement hydraulic components.

It is an object of the present invention to provide a hydro-mechanical transmission system that can be either multiple speed or infinitely variable.

It is an object of the present invention to provide a hydro-mechanical transmission system that can perform the function of hydraulic regenerative braking.

It is an object of the present invention to provide a hydro-mechanical transmission system that can produce a continuously variable braking torque for stopping the vehicle.

It is an object of the present invention to provide a hydro-mechanical transmission system that can be used to retrofit used vehicle to improve their miles/gal.

It is an object of the present invention to provide a hydro-mechanical transmission system that can be used in high power applications such as trucks and busses.

It is an object of the present invention to provide a hydro-mechanical transmission system that can be used on plug-in electric/gas hybrids vehicles to reduce the cost of the batteries and electrics.

It is an object of the present invention to provide a hydro-mechanical transmission system that can achieve infinite variability for vehicles that don't use regenerative braking.

It is an object of the present invention to provide a hydro-mechanical transmission system that can handle high power and torque by using high displacement input pump/motors in relation to the displacement of the output pump/motors.

It is an object of the present invention to produce a general-purpose transmission suitable for most applications.

SUMMARY OF THE INVENTION

The invention is an improvement to the prior art hydro-mechanical transmissions proposed for passenger vehicle use. The invention consists of a total of three or more fixed-displacement hydraulic pump/motors arranged with one or more of them on a common input shaft and one or more on a common output shaft with a total of at least three pump/motors in the input plus the output. Changes in transmission ratio are obtained by de-activating one or more of the pump/motors in a way that allows the de-activated units to continue to be turned without producing a significant power loss. A means is described that allows fluid flow to and from an accumulator to be used for fine adjustment of the transfer ratio such that any transfer ratio below some ratio—determined by the design—to be realized. In addition, an input reduction gear is used to allow larger displacement input pump/motors than would otherwise be possible resulting in a higher torque and power capability of the transmission. In addition the transmission includes a selectable one-way clutch that allows the input shaft to engage the output shaft directly so there is a pure mechanical connection between input and output thus allowing all the pump/motors to become inactive. This allows for high efficiency when the vehicle is cruising and easy disengagement when hydraulic regenerative braking is employed.

The transmission has the capability of applying a continuously variable braking torque when used as part of a braking system.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a chart of the possible gear ratios and power ratings for a particular 4 device transmission.

DETAILED DESCRIPTION OF THE INVENTION

The example used to describe the basic transmission (FIG. 1) uses two hydraulic devices on the input shaft of the transmission capable of operating either as a pump or a motor and two pump/motors on the output shaft capable of operating with the fluid flow in either direction. With valves V1, V2, V4, and V5 in the position shown, both input devices A and B will pump fluid to motors C and D. The transmission ratio is the input rpm divided by the output rpm. In this case the ratio will equal the total output displacement (D+C) divided by the displacement of (A+B). If, for example, V2 is change to the position that causes the fluid to re-circulate within pump/motor B, the transmission ratio or gear ratio will become (C+D)/A. The chart in FIG. 2 shows all the combinations possible with the relative displacements shown resulting in 9 forward speeds. Changing V3 shift the transmission to reverse, and all the same speeds ranges will result.

Figure 3:
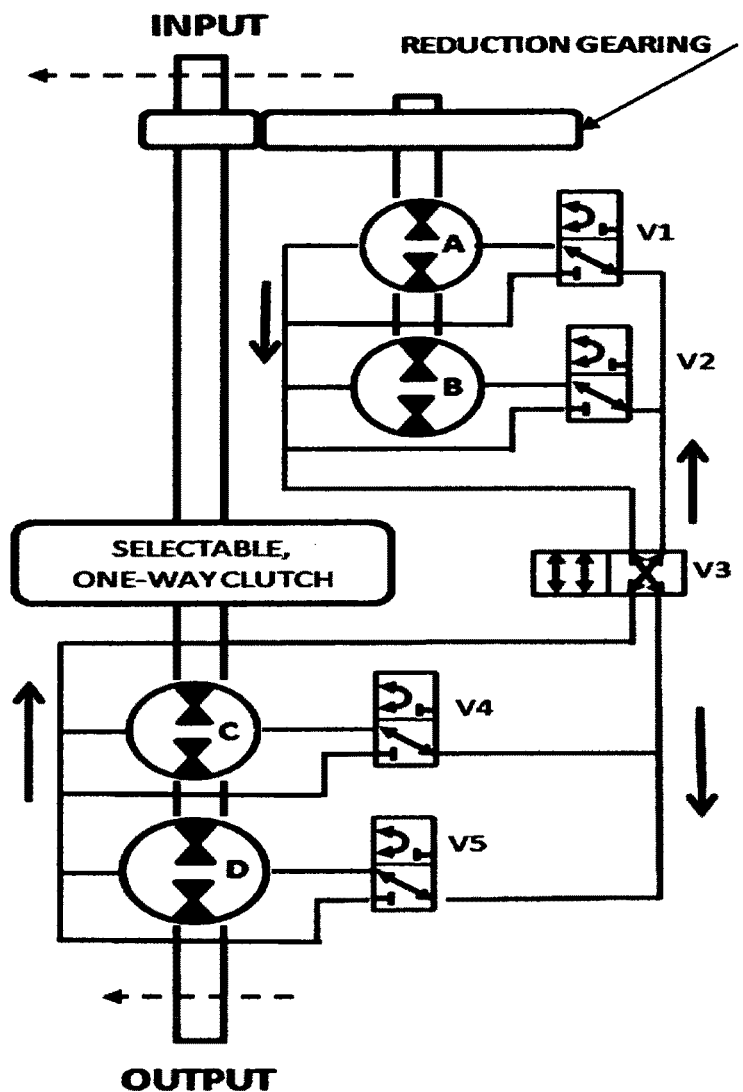
FIG. 3 illustrates the input reduction gear arrangement.

It is desirable to have an input speed reduction gear to allow the use of larger displacement pump/motors in the input relative to the displacement of the output devices and still produce useful transmission ratios. This increases the torque and power capacity of the transmission. The input reduction gear arrangement is shown in FIG. 3.

The chart in FIG. 2 shows that an input reduction ratio of 2.50 was chosen for this example. The relative displacements of FIG. 2 were chosen so that with the addition of the reduction gear, the smallest resulting gear ratio would equal approx. 1. As shown in FIG. 3, the transmission also contains a one-way clutch that connects the input shaft directly to the output shaft. Since by necessity this is a synchronous clutch, it is necessary that the transmission be able to bring the input speed very close to the output speed before the clutch can be selected. Also, since the engaged clutch is intended for use in the case of high speed cruising of the vehicle, this preferable would be the lowest gear ratio of the transmission.

Figure 4:
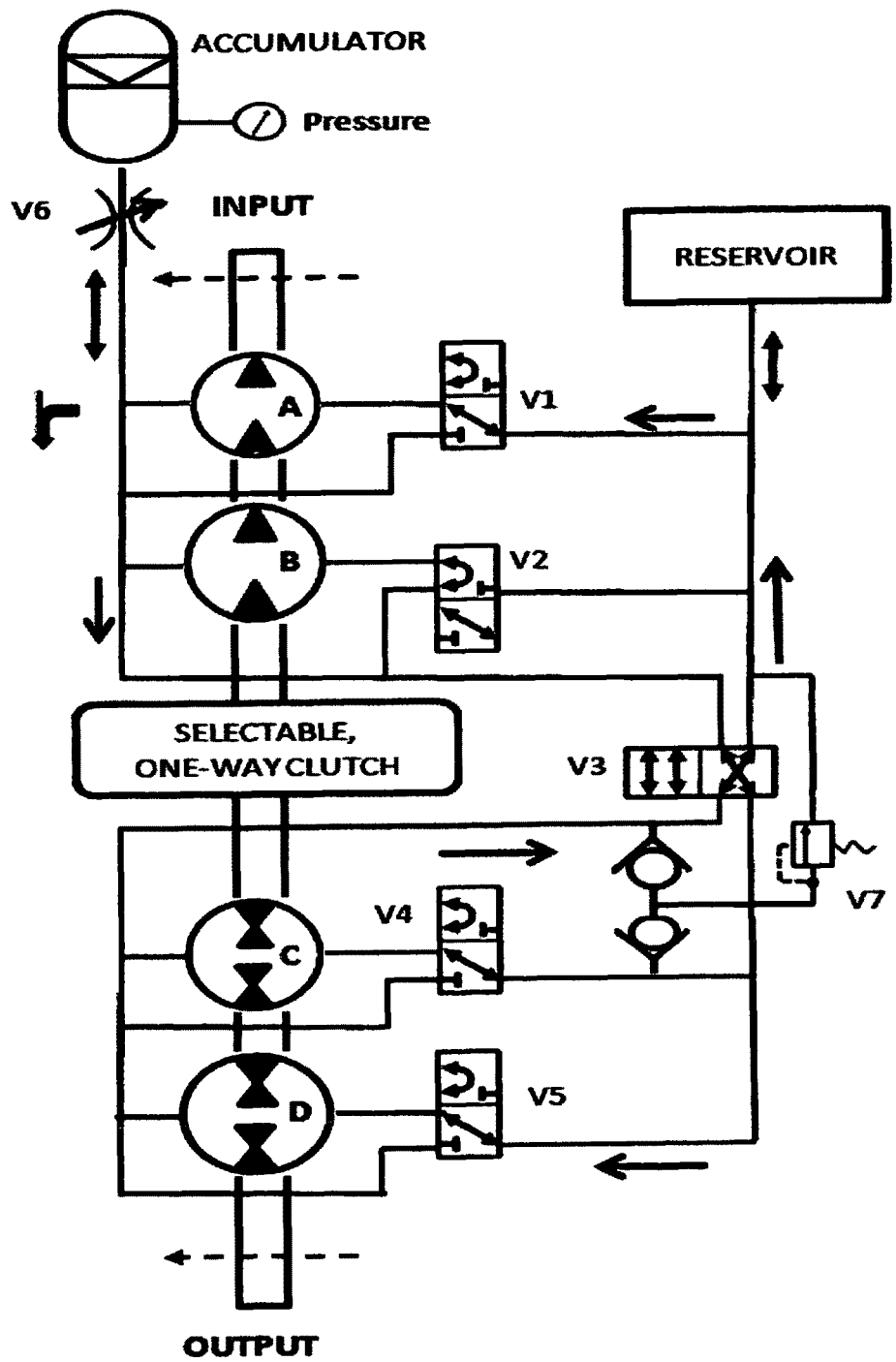
FIG. 4 illustrates a technique to produce an infinitely variable transmission ratio.

FIG. 4 illustrates the addition of a hydraulic accumulator and reservoir to the transmission. With this addition it is possible to obtain any gear ratio between the ones shown in FIG. 2. In the case where the pressure is high in the accumulator, this is done by supplying some of the fluid driving the output motors from the accumulator in addition to that supplied by the input pumps. The fluid from the accumulator is controlled by the use of the flow restricting valve V6. This has the effect of decreasing the gear ratio. Similarly, if the pressure in the accumulator is low, the gear ratio can be increased by allowing some of the fluid from the input pumps to flow into the accumulator by means of V6.

Consequently any gear ratio can be obtained by monitoring the pressure in the accumulator and shifting above or below (depending on the pressure in the accumulator) the desired gear ratio and adjusting V6 to perform the fine adjustment of the gear ratio. The result is an infinitely variable transmission. If this transmission were used in a hydraulic hybrid vehicle, the accumulator and reservoir discussed above would also be required for the energy storage of regenerative braking.

Figure 5:
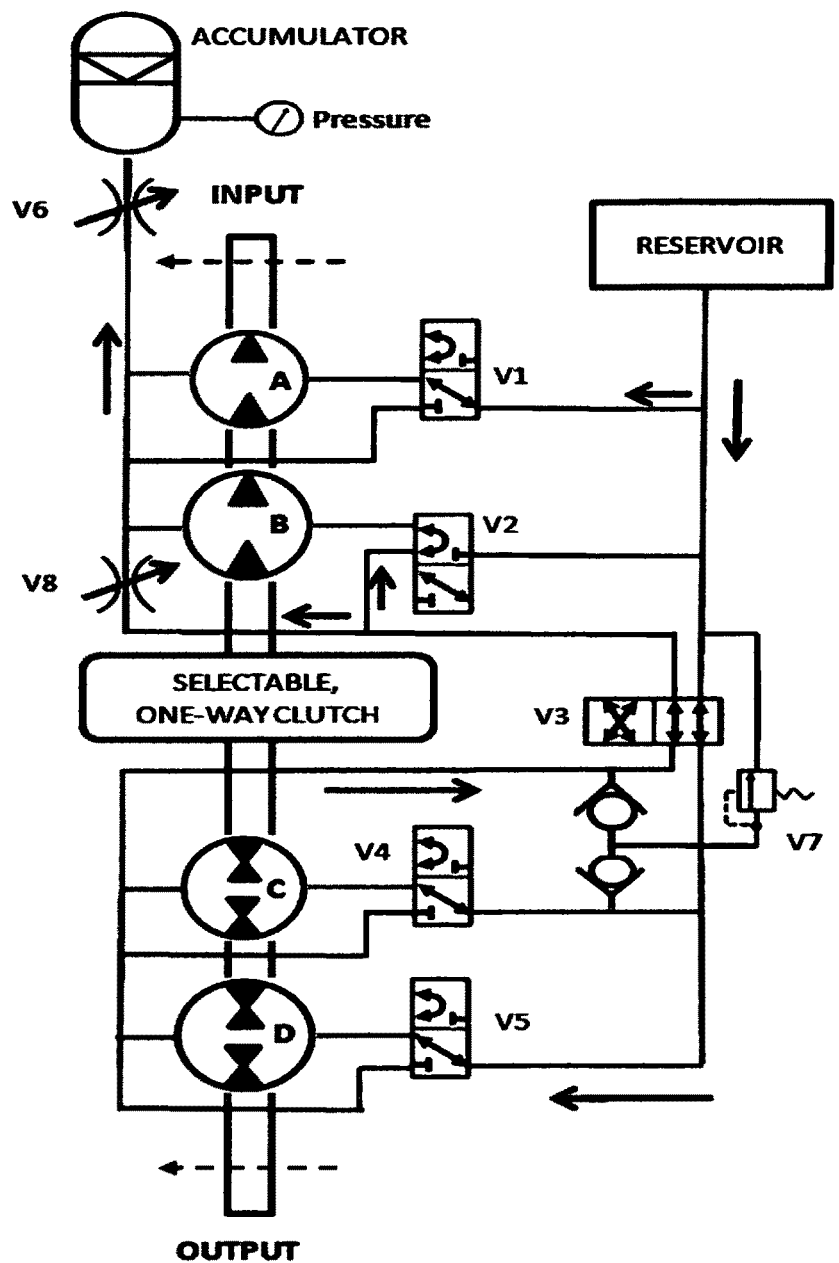
FIG. 5 illustrates a technique to produce continuously variable braking torque.

When the transmission is used to produce braking torque, it is desirable that the torque be continuously variable. FIG. 5 illustrates how that is accomplished with this invention. Valve V3 is set so when the output pumps are driven by the wheels, fluid is pumped from the reservoir to the accumulator to capture and store the braking energy. It is desirable to continuously vary the braking torque generated by this arrangement so the operator can change the degree of braking.

By activating C or D or C+D, 3 levels of braking torque can be selected. As flow restricting valve V8 is closed, fluid is diverted to a path that drives motor B. Motor B in turn drives pump A to pump additional fluid from the reservoir to the accumulator thus increasing the braking torque applied. In this manner, the torque can be continuously varied above the values presented by C or D or C+D. Since the pressure drop across V8 is applied to drive motor B, the loss in efficiency of the regenerative braking cycle is small. Additional variable torque can be produced by introducing a restriction with valve V6; this however will cause a larger loss in efficiency of the regenerative cycle than obtained by using V8.

Figure 1:
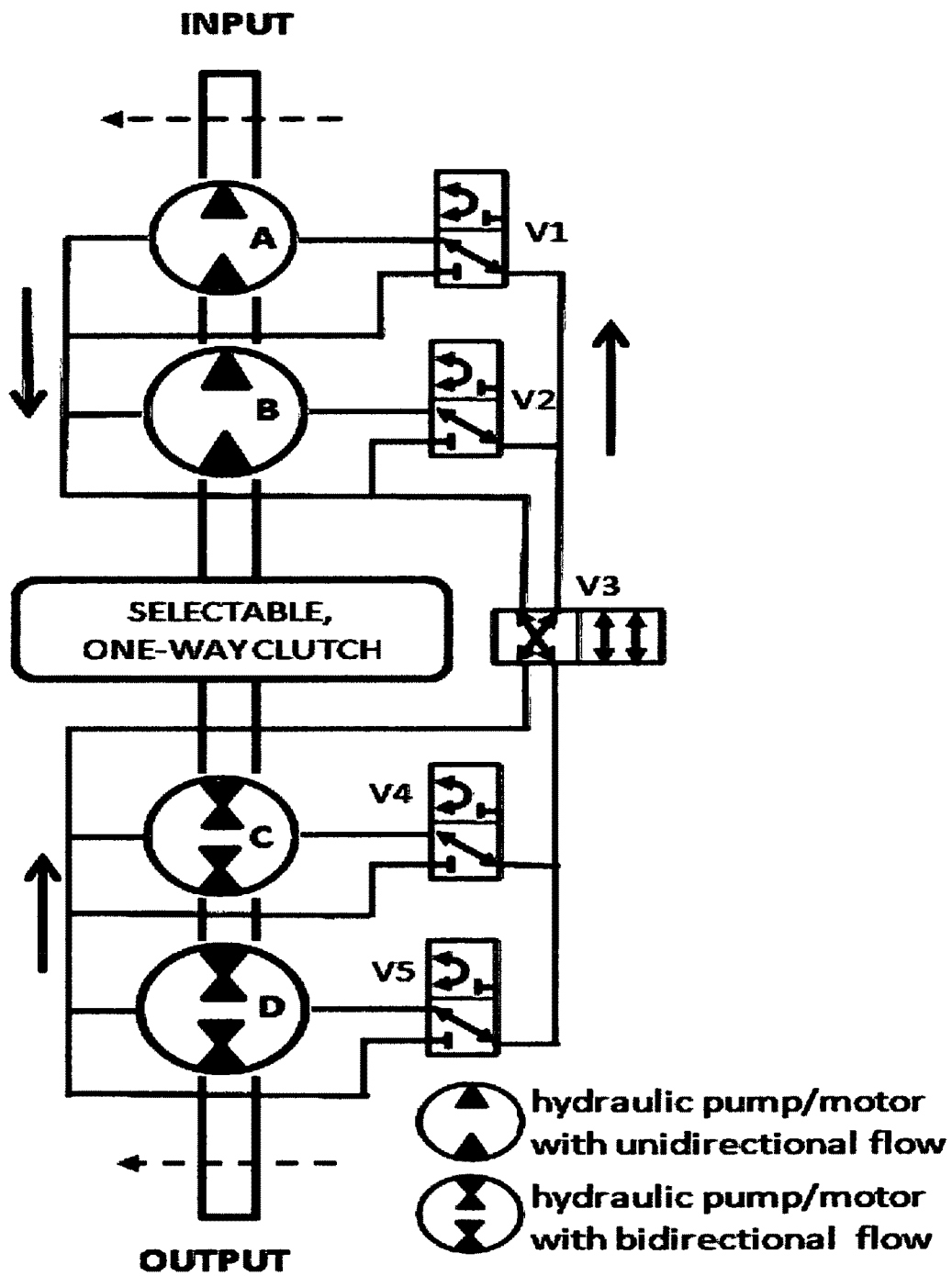
FIG. 1 is a schematic drawing showing the basic transmission.

The transmission ratio can also be changed in a variable manner by partially opening or closing any of valves V1, V2, V4 and V5 in FIG. 1. This results in a reduction of efficiency.

Valve V7 is a pressure relief valve to protect the hydraulic pump/motors from an over-pressure condition. When the braking torque produces a pressure close to the rated pressure of the pump/motors, the back-up conventional brakes would be applied.

Figure 6:
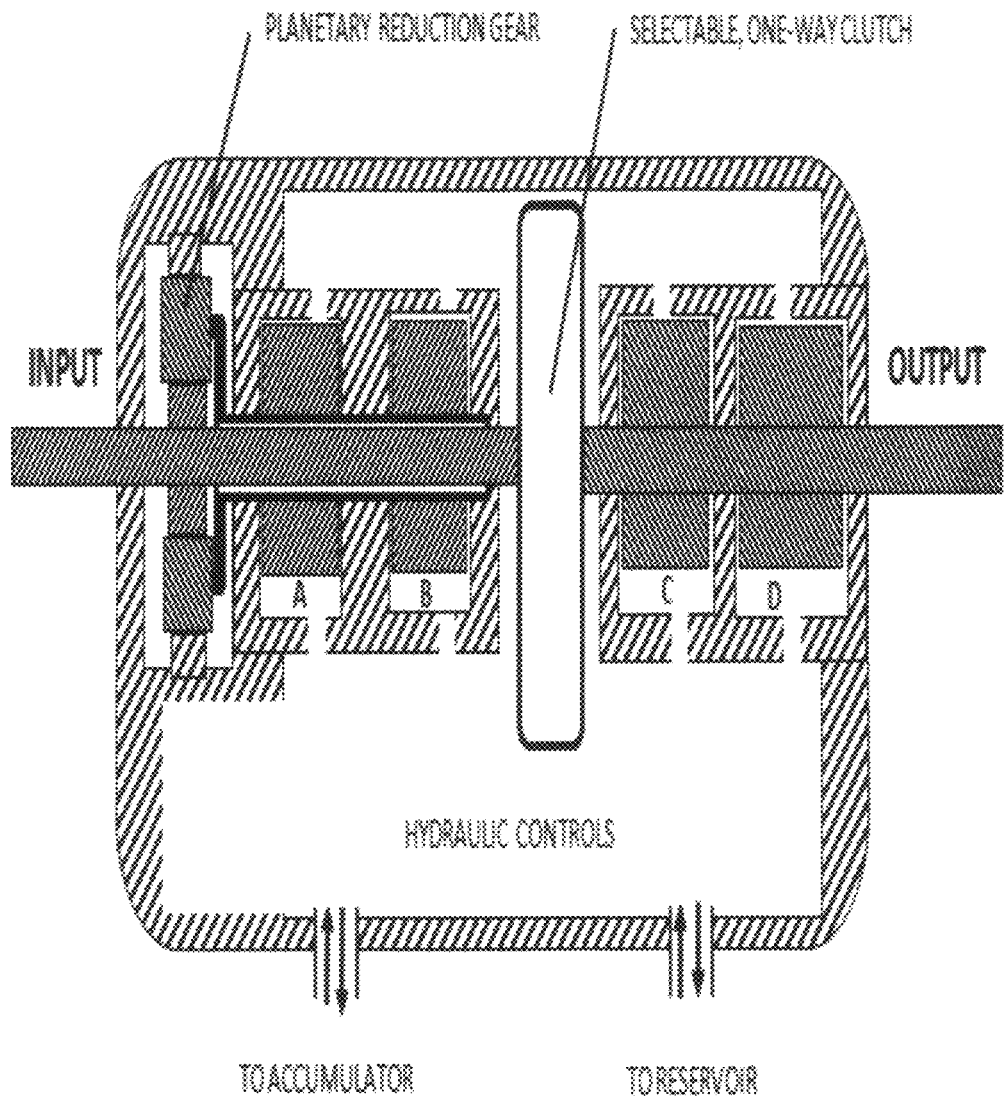
FIG. 6 is a cutaway view of a preferred form of mechanical packaging of the transmission.

A preferred construction arrangement is illustrated in FIG. 6. In this concentric structure, the input shaft passes through the shaft of the input pump/motors resulting in minimum physical size of the transmission. If the accumulator and reservoir only serve the function of producing infinite variability and not that of braking energy storage, they would be small enough to be mounted in the same case as the transmission.

What is claimed is:

1. A hydraulic transmission comprising:
   a) one or more fixed displacement hydraulic pump/motors mounted on a common input shaft;
   b) one or more fixed displacement hydraulic pump/motors mounted on a common output shaft;
   c) a total count of three or more pump/motors;
   d) hydraulic fluid pathways that connect all input pump/motors in parallel to all output pump/motors in parallel; and
   e) hydraulic fluid valves and pathways that allow the fluid in each pump/motor to be re-circulated directly back on itself or not;
   f) hydraulic controls selectively activating the hydraulic fluid valves causing any or all of the pump/motors to be deactivated by causing the hydraulic fluid to be re-circulated directly back to the deactivated pump/motor; and
   g) a valve that causes the flow from the input pump/motors to the output pump/motors to change direction in the output pump/motors.

2. A hydraulic transmission system described in claim 1 further comprising a hydraulic reservoir attached by a fluid path to one side of the input or output pump/motors and a hydraulic accumulator attached to the other side of the input or output pump/motors through one or more flow restricting valves.

3. A hydraulic transmission system described in claim 1 further comprising a flow restricting valve in the re-circulation fluid pathway from the output to the input on one or more of the pump/motors on the common input shaft.

4. A hydro-mechanical transmission system described in claim 1 wherein one of the common input shaft or an input shaft of the transmission is connected to the common output shaft by a selectable, one-way clutch.

5. A hydro-mechanical transmission system described in claim 2 wherein one of the common input shaft or an input shaft of the transmission is connected to the common output shaft by a selectable, one-way clutch.

6. A hydro-mechanical transmission system described in claim 3 wherein one of the common input shaft or an input shaft of the transmission is connected to the common output shaft by a selectable, one-way clutch.

7. A hydraulic transmission system described in claim 1 wherein the common input shaft is driven by a speed reduction gear connected to an input shaft and an output shaft for the purpose of increasing the allowable displacement of the input pump/motors relative to the output pump/motors.

8. A hydraulic transmission system described in claim 2 wherein the common input shaft is driven by a speed reduction gear connected to an input shaft and an output shaft for the purpose of increasing the allowable displacement of the input pump/motors relative to the output pump/motors.

9. A hydraulic transmission system described in claim 3 wherein the common input shaft is driven by a speed reduction gear connected to an input shaft and an output shaft for the purpose of increasing the allowable displacement of the input pump/motors relative to the output pump/motors.

10. A hydraulic transmission system described in claim 4 wherein the common input shaft is driven by a speed reduction gear connected to the input shaft of the transmission and an output shaft for the purpose of increasing the allowable displacement of the input pump/motors relative to the output pump/motors.

11. A hydraulic transmission system described in claim 5 wherein the common input shaft is driven by a speed reduction gear connected to the input shaft of the transmission and an output shaft for the purpose of increasing the allowable displacement of the input pump/motors relative to the output pump/motors.

12. A hydraulic transmission system described in claim 6 wherein the common input shaft is driven by a speed reduction gear connected to the input shaft of the transmission and an output shaft for the purpose of increasing the allowable displacement of the input pump/motors relative to the output pump/motors.

13. A hydro-mechanical transmission system described in claim 7 wherein the speed reduction gear is implemented with a planetary gear and the output shaft of the reduction gear is tubular and serves as the common input shaft of the input pump/motors and is positioned concentric with the input shaft of the speed reduction gear which is also the input shaft of the transmission and connects directly to a selectable one-way clutch.

14. A hydro-mechanical transmission system described in claim 8 wherein the speed reduction gear is implemented with a planetary gear and the output shaft of the reduction gear is tubular and serves as the common input shaft of the input pump/motors and is positioned concentric with the input shaft of the speed reduction gear which is also the input shaft of the transmission and connects directly to a selectable one-way clutch.

15. A hydro-mechanical transmission system described in claim 9 wherein the speed reduction gear is implemented with a planetary gear and the output shaft of the reduction gear is tubular and serves as the common input shaft of the input pump/motors and is positioned concentric with the input shaft of the speed reduction gear which is also the input shaft of the transmission and connects directly to a selectable one-way clutch.

16. A hydro-mechanical transmission system described in claim 10 wherein the speed reduction gear is implemented with a planetary gear and the output shaft of the reduction gear is tubular and serves as the common input shaft of the input pump/motors and is positioned concentric with the input shaft of the transmission which is connected directly to the one-way clutch.

17. A hydro-mechanical transmission system described in claim 11 wherein the speed reduction gear is implemented with a planetary gear and the output shaft of the reduction gear is tubular and serves as the common input shaft of the input pump/motors and is positioned concentric with the input shaft of the which is connected directly to the one-way clutch.

18. A hydro-mechanical transmission system described in claim 12 wherein the speed reduction gear is implemented with a planetary gear and the output shaft of the reduction gear is tubular and serves as the common input shaft of the input pump/motors and is positioned concentric with the input shaft of the transmission which is connected directly to the one-way clutch.

* * * * *